United States Patent [19]

Runtsch

[11] 4,021,699

[45] May 3, 1977

[54] DEVICE FOR LIMITING CURRENTS

[75] Inventor: Erhard Runtsch, Hemsbach, Germany

[73] Assignee: Brown, Boveri & Cie. A.G., Mannheim, Germany

[22] Filed: Aug. 13, 1975

[21] Appl. No.: 604,147

[30] Foreign Application Priority Data

Aug. 14, 1974 Germany .......................... 2439066

[52] U.S. Cl. .......................... 361/11; 200/144 AP; 361/13

[51] Int. Cl.$^2$ .......................................... H02H 7/22

[58] Field of Search ............. 317/11 C, 11 E, 11 R, 317/20, 11 A; 200/144 R, 144 AP, 11 R; 338/39, 104, 105, 110, 113, 187, 215

[56] References Cited

UNITED STATES PATENTS

| | | | |
|---|---|---|---|
| 2,818,479 | 12/1957 | Volk | 338/215 |
| 3,221,114 | 11/1965 | Maeda | 200/11 R |

FOREIGN PATENTS OR APPLICATIONS

| | | | |
|---|---|---|---|
| 655,182 | 1/1963 | Canada | 200/144 AP |
| 1,194,949 | 6/1965 | Germany | 200/144 AP |
| 1,939,555 | 2/1970 | Germany | 200/144 AP |
| 406,844 | 3/1934 | United Kingdom | 200/144 AP |

*Primary Examiner*—William H. Beha
*Assistant Examiner*—Patrick R. Salce
*Attorney, Agent, or Firm*—Herbert L. Lerner

[57] ABSTRACT

The combination of a current limiting device and at least one openable isolating point electrically connected therewith, the current limiting device including a variable, pressure-sensitive solid-state resistance the resistance being variable from an initially relatively very low resistance or impedance value to a relatively very high resistance or impedance value when the isolating point is opened, the solid-state resistance being integrated into the isolating point as a switch contact member.

6 Claims, 5 Drawing Figures

DEVICE FOR LIMITING CURRENTS

Figure 1A:
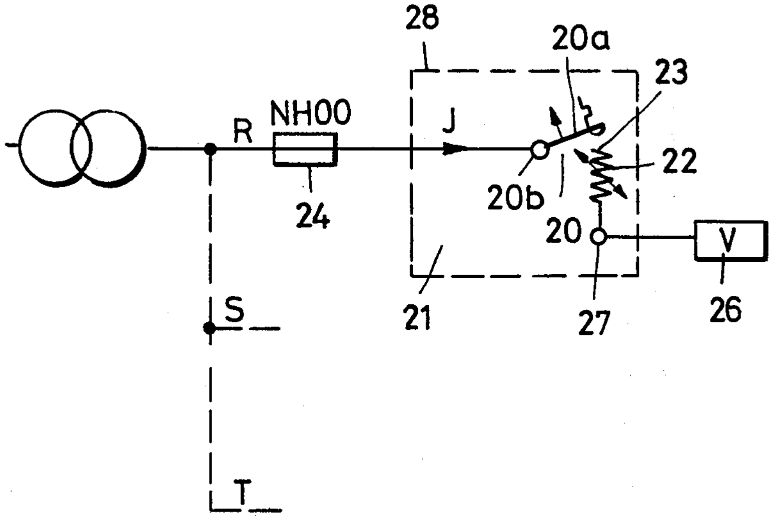

The invention relates to a device for limiting currents, especially short-circuit currents, which is serially connected to at least one isolating point and has a current limiting member which includes a resistance dependent upon at least one physical parameter and which is sharply variable in resistance value from a very low to a very high value upon opening of the isolating point.

The invention further relates to a device for limiting currents, especially short-circuit currents, with at least one isolating point and a variable current limiting resistance connected in parallel therewith, the current limiting resistance being initially low-ohmic and having a voltage drop across the same that is below arc firing voltage, the resistance being high-ohmic thereafter.

Such devices serve the purpose, amongst others, of limiting high alternating currents, at low cost, without requiring recourse to a current-limiting electric arc, within a half-period of the alternating current, selectively per phase of a three-phase supply system, for a low-voltage high-capacity fuse connected at the supply side. This demand of the selective current limiting necessarily or positively results from the very high capacity performance of the power supply company or electric utility which, on its part, leads to an increase in the short circuit power or capacity. To limit high currents, it is necessary to shorten the switching periods. As is generally known, the switching capacity and the time in which line protection switches limitingly switch off high currents are, respectively, small and long so that the current limiting thereby is insufficient to prevent the undesired switching-off of the low-voltage high-capacity fuse connected at the supply side. Therefore there is a simultaneous response of the low-voltage high-capacity fuse and release or triggering of the line protection switch. This has the disadvantage that the user:

1. is not made aware of the low-voltage high-capacity fuse of the respective phase that has become ineffective or inoperative and
2. due to respective regulations or directions of the electric utility the damaged low-voltage high-capacity fuse may not be effectively exchanged by ones self.

Due to these facts, the switching device must be manufactured so that an effective, selective current limitation for the respective low-voltage high-capacity fuse is possible while maintaining the installation-distribution board or system. The installation-distribution board or system for example, the house installation-distribution board or system should experience no material variations in dimensions so that, at any time, a subsequent installation of the most advanced type can be effected without great cost with a suitable switch device. For new distribution boards or systems, it should, in fact, be possible to make them smaller.

It is generally known to provide, serially-connected to line protection switches, means for attaining a limitation of currents that have become excessively large. Since these means can, however, not ensure adequate limitation of currents that are above the switching-off capacity of the line protection switch, there has been connected to the line protection switch an automatically opening additional switch location with resistance into the circuit. Because of the resistance, it is thereby possible that the line protection switch continues to have a partial current of the occurring high current to switch.

To fulfil the requirements it is furthermore known from German Published Non-Prosecuted Application DT-OS No. 23 33 631 that the resistance connected in parallel with a short-circuiter is a current-limiting resistance with positive temperature coefficients, the resistance value of which is such that the maximal heating thereof is located below the melting temperature of the resistance material. Through the assembly of the additional short-circuiter with the series-connected line protection switch, a subdivision of the current limitation is supposed to be effected with the result that, through the subdivision of the total energy into two limiter units with one isolating point, respectively, wear is reduced to a tolerable extent. In order to attain an adequate limiting of the current it is above all necessary, as mentioned hereinbefore, that:

1. complete line protection switches with unchanged dimensions are placed in operation i.e. additional space is required,
2. the volume of the switching space required by the line protection switch is maintained without change, and
3. the arc-forming device, as before, is required and experiences no simplification thereof (for example, through elimination of arc splitters and arcing chambers).

A switching system hs become known heretofore from German Published Non-Prosecuted Application DT-OS No. 22 51 138 wherein, parallel to an isolating point, another isolating point is electrically connected to a switch member serially connected therewith. The switching system of the last-mentioned published German application which is connected in series with the other isolating point possesses the characteristics of a contactless switch. In that case, a change in conductivity of the switch member depends upon two variables, namely the voltage and the time. Only after the change in conductivity of the contactless switch, does the opening of the other isolating point serially connected with the switch member take place, somewhat later in time in dependence upon the switch member. There is no suggestion either in the description nor in the figures of the last-mentioned German published application as to how the switch member acts upon the isolating point serially connected therewith in order to effect the opening thereof. With such a complex switch system as that of the last-mentioned German published application it should be possible, without great expense (coordinating the switch components one with another), to integrate the switch system into existing installation-distribution boards or systems for the purpose of special current limitation, the financial increase through the additional isolating point being remaining accordingly unaccounted for.

A further serious disadvantage of the switch system of the last-mentioned German published application is the electrical matching to the respective installation-distribution board or system i.e. a narrow tolerancing must now be added to the already costly-to-manufacture switch member. Also, this switch system of the last-mentioned German published application requires additional space in the already tightly dimensioned installation-distribution board or system.

It is accordingly an object of the invention to provide a device for limiting high currents which can flow through low voltage high-capacity fuses connected at the supply side, whereby when switching a considerable reduction in the electric arc energy is attained so that the switch space volume and the dimensions of the device, accordingly, are reducible to a minimum.

With the foregoing and other objects there is provided in accordance with the invention, a device for limiting currents of the foregoing types wherein the variable resistance is a pressure-sensitive solid-state member which is integrated into the isolating point as a contact member.

A surprising advantage of the invention of the instant application is that the current limitation is effected solely and individually by the variable resistance during the opening of the isolating point, the isolating point per se having no current limiting members, such as arc splitters, for example. Assurance can be provided that the current limitation take place selectively for the low-voltage high-capacity fuse connected at the supply side in one phase of the three-phase supply system.

In accordance with the invention, the member limiting the current is therewith a pressure-sensitive solid-state resistance with a relatively very low initial resistance value. The pressure-sensitive resistance experiences, at the beginning of the switching operation, a suitable variation in pressure or load in the form of a variation of resistance as a consequence of the lifting of the movable contact member, whereby the pressure-sensitive resistance experiences a very rapid and steep increase in resistance. As a result of the increase in resistance, it is then possible to limit the amount of electricity, namely the so-called conducted or transmitted value, $$Q = \int I_k^2 \, dt$$

selectively for a low-voltage high capacity fuse connected at the supply side of the switching device. The pressure-sensitive or pressure-responsive resistance is chosen so that also overheating and destruction of the components belonging to the switching device can be avoided. Through the use of a pressure-sensitive or pressure-responsive resistance, in the form of plate springs, which are integrated into the contact member, in accordance with another feature of the invention, it is possible that the isolating point connected in parallel therewith requires no wear-resistant members controlling an electric arc. It is accordingly obvious that the power loss through the pressure-sensitive resistance and the mounting support, for nominal current, is held within low limits.

With the embodiments of the switching device according to the invention (series or parallel connection of the pressure-sensitive resistance to the isolating point), both the thermal and dynamic loading or stressing of the switch device as well as of the system or assembly is reduced to a marked extent through the limitation of the short-circuit current. To attain the aforedescribed conduction or transmission value, even under extreme conditions, the correct resistance material and the value of the resistance can be determined by the man of ordinary skill in the art.

Further embodiments and advantageous improved features of the invention are derivable from the hereinafter included claims.

The device of the invention furthermore affords that the following equation for the expression $q$ which is the relative conduction or transmission value within a half-period of the alternating current is valid:

$$q = \frac{\int i^2 \cdot dt}{I_p^2 \cdot T/2} < \frac{Q_s}{I_p^2 \cdot T/2}$$

wherein:

$Q_s$ = melting point of the low-voltage, high-capacity fuse $I_p$ = test current $T/2$ = half-period of the alternating current $i$ = instantaneous value of the current;

that is, for the low-voltage high-capacity fuse connected at the supply side to one phase of the three-phase current, no danger of disruption or disturbance exists for an impending high current, such as 6kA, for example.

Other features which are considered as characteristic for the invention are set forth in the appended claims.

Although the invention is illustrated and described herein as embodied in device for limiting currents, it is nevertheless not intended to be limited to the details shown, since various modifications and structural changes may be made therein without departing from the spirit of the invention and within the scope and range of equivalents of the claims.

Figure 1:
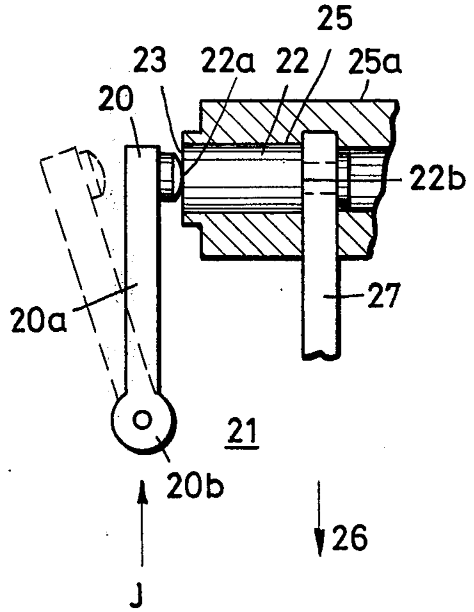
Figure 2:
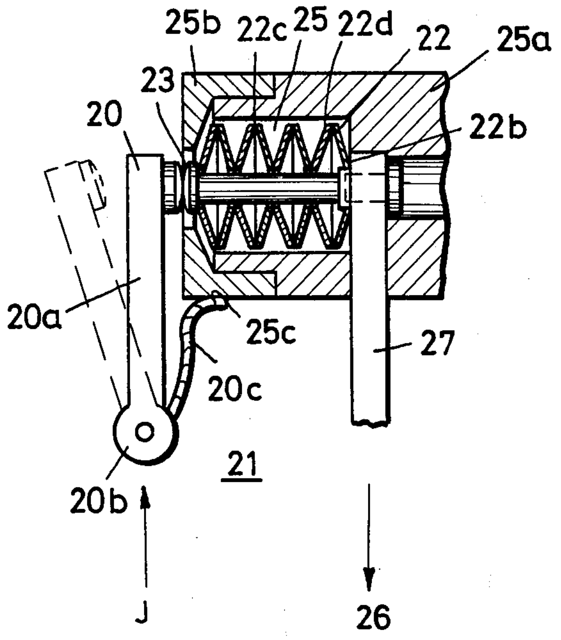
Figure 2A:
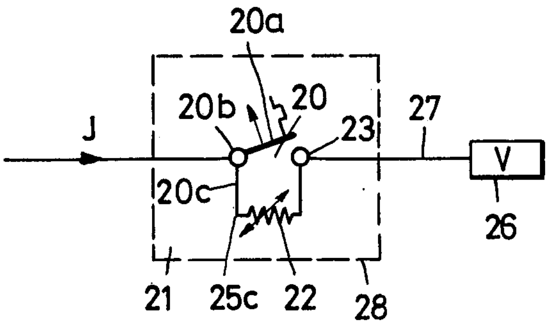
Figure 3:
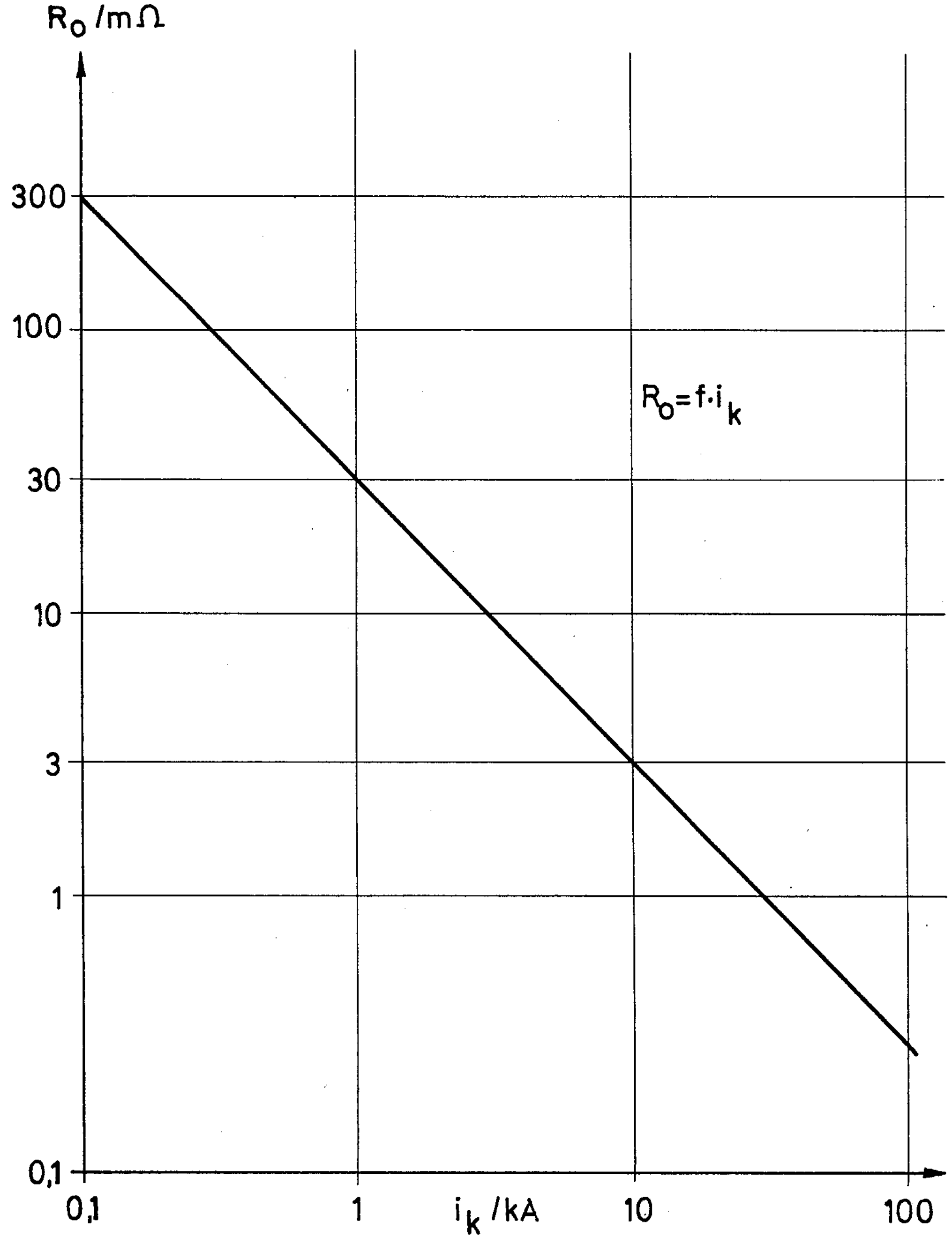

The construction and method of operation of the invention, however, together with additional objects and advantages thereof will be best understood from the following description of specific embodiments when read in connection with the accompanying drawings, in which:

FIG. 1 is a diagrammatic view, partly in section, of a device for limiting currents according to the invention of the instant application in series connection with a contact constructed as a variable, pressure-sensitive solid-state resistance;

FIG. 1*a* is an equivalent circuit diagram or electrical analog of the assembled device of FIG. 1;

FIG. 2 is a view similar to that of FIG. 1 of another embodiment of the invention wherein the variable pressure-sensitive contact is formed of plate springs and is connected in parallel with the the device for limiting currents;

FIG. 2*a* is an equivalent circuit diagram or electrical analog of the assembled device of FIG. 2; and FIG. 3 is a plot diagram showing a characteristic curve of the voltage at the instant of opening the contact of the embodiment of FIG. 2 against the current value for the variable pressure-sensitive solid-state resistance.

Referring now to the drawings and first, particularly, to FIG. 1*a* thereof, there is shown an electric analog of the device for limiting currents, especially short-circuit currents, in accordance with the invention, which is employed, in a preferred embodiment, together with a grouping of low-voltage high-rupturing-capacity (HRC) or high-breaking-capacity (HBC) fuses in one phase of a three-phase a-c system or network, and constitutes an isolating point 20 without current-limiting elements (arc splitters and the like) and with a variable, pressure-sensitive solid-state resistance 22 integrated into a contact member 23. Low-voltage HRC fuses, as is generally known, excel over a line protection switch by having a higher short-circuit switching or making-and-breaking capacity; nevertheless, upon the occurrence, for example, of an initial short circuit, the low-voltage HRC fuse may blow, and it is just this which is supposed to be prevented by the invention of the instant application.

The device of the invention for selectively limiting short-circuit currents, is identified generally by the reference numeral 21 in FIG. 1*a*, wherein the short-circuit current flows through low-voltage HRC fuses 24 of a three-phase system R,S,T of 127/220 v, 220/380 v and 380/660 v (shown only as single-phase in FIG. 1*a*), the fuses 24 being connected on the supply side of the isolating point 20, the device of the invention including a variable, pressure-sensitive solid-phase resistance 22 of the low-voltage HRC fuse 24 serially connected to the isolating point 20. The isolating point 20 constructed as a normally-closed contact switch has a movable contact member 20*a* and a stationary contact member 23 and is connected to the variable, pressure-sensitive solid-state resistance 22 of the low-voltage HRC fuse 24 on the load side thereof. The supply of current I is delivered through a stem 20*b* of the contact member 20*a* which, for its part, produces a galvanic connection with the contact member 23, which is formed as a variable, pressure-sensitive solid-state resistance 22, directly to the load 26. The device 21 is formed of an alignable casing 28 which snaps open on standard-profile supporting rails in a conventional manner in the installation distribution boards (house installation distribution board). The casing 28 is considerably smaller due to the fact that the current limiting device of the line protection switch, such as arc splitters and the like, for example, can be dispensed with, and it therefore requires less space. Subsequent outfitting thereof into a previously existing installation distribution board therefore causes no difficulties and is possible without any great outlay and expense when considered in light of the advantage derived therefrom.

In FIG. 1, the device 21 is shown in structural detail as a closed contact unit wherein the variable, pressure-sensitive solid-state resistance 22 is located in a special form in an output or discharge line 27. The special form of the resistance 22 is, for example, that of pressure-sensitive, cylindrical solid member having a cross-sectional surface 22*a* which forms the contact 23 of the isolating point 20. The cylindrical part of the resistance 22 is disposed in an opening 25 formed in a member 25*a* consisting of insulating material, a direct connection between the resistance 22 and the member 25*a* of insulating material being effected only through a cross-sectional surface 22*b*. The output or discharge line 27, which, for its part leads directly to the load 26, is located at the cross-sectional surface 22*b*. The resistance value of the variable, pressure-sensitive resistance 22 is such that it changes the low value therof very rapidly into a large value limiting the current, during lifting or opening of the contact 20*a* from the cross-sectional surface 22*a* of the contact 23. Due to the thus-dimensioned resistance 22, no electric arc is drawn when the isolating point 20 is opened. Furthermore, the resistance 22 limits instead of the electric arc, and effects the desired current limitation through the surge-like increase of the value thereof.

In accordance with the embodiment of the invention shown in FIG. 2, the cylindrical solid-state resistance 22 supported in an opening 25 formed in a member 25*a* consisting of insulating material is made up of individual plate springs 22*d* disposed in layers to form a stack 22*c*. In this embodiment of FIG. 2, an increase or decrease in the contact pressure can be effected by, respectively, adding or removing individual plate springs 22*d*.

The resistance material of which the individual plate springs 22*d* are formed can, moreover, be selected and combined so that a current limitation of every conceivable forward conducting value is possible and accordingly adjustable relatively rapidly. With this extensive possibility of adjustment, an uncomplicated and thereby economical manufacture of the device of the invention is possible.

In the device 21 of the invention according to FIG. 2, the solid-state resistance formed of a stack 22*c* of layers thereof, are disposed parallel to the isolating point 20 due to appropriate measures or features as is readily apparent from FIG. 2*a*. For the purpose of current conduction during the limiting operation, the device 21 has a current lead-in line 20*c* fastened to the root 20*b* of the contact member 20*a* and being furthermore galvanically connected to an electrically conductive cap 25*b*. Objectives which the cap 25*b* are obliged to meet are, on the one hand, to fix the stacked plate springs 22*d* reliably against displacement in axial direction (maximal expansion) and, on the other hand, to permit parallel connection of the variable, pressure-sensitive solid-state resistance 22 formed of plate springs 22*c*.

At an impending short-circuit current flow, the isolating point 20 lifts the bridging or shunting of the pressure-sensitive solid-state resistance 22. At the instant the isolating point 20 is opened, the voltage drop at pressure-sensitive solid-state resistance 22 connected in parallel with the isolating point 20 is very small. The increase in resistance occurs only after the isolating point 20 is opened. The resistance value of the pressure-sensitive solid-state resistance 22 is preferably such that for the highest short-circuit current produced in the device, the voltage drop upon opening the contact 20 is smaller than is the arc firing voltage i.e. about 30 v are not exceeded.

When the contact member 20*a* is lifted from the contact member 23, the stack 22*c* of plate springs 22*d* expand axially so that the plate spring 22*d* forming the free end of the stack 22*c* engages a region of the inner surface of the metallic cap 25*b*. Through this engagement of the plate spring 22*d* with the cap 25*b*, a direct connection is formed between the root 20*b* of the isolating point 20 and the variable, pressure-sensitive solid-state resistance 22, due to a galvanic connection 25*c* between the metallic cap 25*b* and the current lead-in line 20*c* secured thereto.

As is readily apparent from FIG. 1*a*, it is within the scope of the invention of the instant application, to operate such a device with a solid-state resistance also in a series circuit connection.

In FIG. 3, there is shown in a plot diagram the characteristic curve of the voltage at the instant the contact member 20*a* of the embodiment of FIG. 2 is opened against the current value for the variable, pressure-sensitive solid-state resistance 22. The value $V_o = 30$ v indicates, for conventional switches, the upper permissible limit of the voltage at which an arc can reliably be avoided. Standard letter symbols for resistance and current are employed in FIG. 3.

The advantage of the use of a variable, pressure-sensitive solid-state resistance is that high power outputs can be switched with an initially low-resistance variable, pressure-sensitive resistance. Low-resistance variable, pressure-sensitive resistances can be mass-produced with narrow tolerances, moreover; in a relatively simple manner, as is apparent from the aforedescribed embodiments, which, in turn, means that the unit price thereof is very low.

With the switch devices constructed in accordance with the aforedescribed and illustrated embodiments of the invention, both the thermal and dynamic loading or stressing of the switching devices as well as of the plant or system are reduced to a marked extent due to the limitation of the short-circuit current.

There is claimed:

1. In combination, a current limiting device and at least one openable isolating point electrically connected therewith, said current limiting device comprising a variable, pressure-sensitive solid-state resistance, said resistance being variable from an initially relatively very low resistance or impedance value to a relatively very high resistance or impedance value when said isolating point is opened, said solid-state resistance being integrated into said isolating point as a switch contact member.

2. The combination of claim 1 wherein said current limiting device and said isolating point are connected in series, and said resistance springing sharply from said very low to said very high resistance value at the instant said isolating point is opened.

3. The combination of claim 1 wherein said solid-state resistance is connected in parallel with said isolating point, said solid-state resistance being initially low-ohmic and having a voltage-drop across the same that is below arc firing voltage, and said solid-state resistance being high-ohmic in open condition of said isolating point.

4. The combination of claim 1 wherein said pressure-sensitive solid-state resistance is constructed of at least one spring formed of resistance material.

5. The combination of claim 4 wherein said spring is a plate spring.

6. The combination of claim 4 wherein said spring is a helical compression spring.

* * * * *